United States Patent [19]

Welt

[11] Patent Number: 5,501,020

[45] Date of Patent: Mar. 26, 1996

[54] FASTENER AND DRILL BIT GAUGE

[76] Inventor: Jack W. Welt, 9550 Mariner's Cove La., Fort Myers, Fla. 33919

[21] Appl. No.: 400,715

[22] Filed: Mar. 8, 1995

[51] Int. Cl.$^6$ .................................................... G01B 3/34
[52] U.S. Cl. ............................................ 33/555.2; 33/563
[58] Field of Search ............................... 33/555.1, 555.2, 33/562, 563, 567

[56] References Cited

U.S. PATENT DOCUMENTS

| | | | |
|---|---|---|---|
| 1,246,536 | 11/1917 | Bristol | 33/555.2 X |
| 1,881,651 | 10/1932 | Judge | 33/562 |
| 2,475,450 | 7/1949 | Dvorak | 33/555.2 |
| 2,728,145 | 12/1955 | Holladay | 33/555.2 X |
| 2,896,333 | 7/1959 | Kivela | 33/555.2 X |
| 3,416,650 | 12/1968 | Mortensen | 33/555.2 X |
| 3,703,234 | 11/1972 | Howard | 33/555.2 X |

*Primary Examiner*—Thomas B. Will
*Attorney, Agent, or Firm*—William E. Noonan

[57] ABSTRACT

A fastener and drill bit gauge is disclosed. The apparatus includes a gauge element having a first series of holes with different respective diameters formed therein and arranged in order of progressively increasing diameter. Each hole in the first series has a diameter that corresponds to the diameter of a hole formed by a respective drill bit. A second longitudinal series of holes with different respective diameters is formed through the gauge element and arranged substantially parallel to the first series in a like order of progressively increasing diameter. Each hole in the second series is transversely aligned with a corresponding hole in the first series and has a diameter that corresponds with the diameter of a respective fastening element. The respective fastening element is engageable with a drill bit hole having a diameter of the aligned hole in the first series. Drill bits and fastening elements are engaged with holes in the first and second series, respectively, to measure a selected size for one of a drill bit and a fastening element and determine a corresponding size for the other of the drill bit and the fastening element.

13 Claims, 3 Drawing Sheets

FASTENER AND DRILL BIT GAUGE

FIELD OF THE INVENTION

This invention relates to a fastener and drill bit gauge, and more particularly, to a gauge for quickly and conveniently measuring the diameter of a selected fastening element and matching that fastener with a corresponding drill bit.

BACKGROUND OF THE INVENTION

A wide variety of fastening elements are available for securing items to walls and other surfaces. Such fasteners include common nails, self-tapping screws, machine screws, plastic screw anchors (used in plaster board and the like), lead screw anchors (used in masonry), hollow wall anchors, masonry screws, and cotter pins. In certain applications, a fastener of a desired diameter is required; however, this diameter is rarely if ever printed on the fastening element. If many sizes of fastening elements are available, it can be a slow and tedious process to select a fastener having the correct size for a particular application. Often, calipers are required to perform accurate measurements.

The guess work and delay associated with selecting a correctly sized fastening element are increased when a drill bit is required to form or drill a hole for engageably receiving the fastening element. It may be difficult, if not impossible, to determine the appropriate drill bit size that corresponds to a particular fastening element. Even when written instructions call for a specific drill bit diameter or the user has a chart of corresponding fastener and drill bit sizes, proper selection and matching may be complicated if the sizes are not printed clearly on the drill bits. In many cases, drill bit diameters are unclear, obliterated, or all together missing from the bit. As a result, the user is reduced to "eye-balling" the fasteners and drill bits and must guess the correct sizes. Alternatively, the user may again be forced to use time consuming and tedious measuring tools such as calipers.

Selecting the proper fastener is important; selecting a drill bit that corresponds to a particular fastener is required so that the fastener exerts its optimal holding power. Furthermore, a screw inserted in an improperly sized hole may cause damage to the surface.

SUMMARY OF INVENTION

It is therefore an object of the present invention to provide a gauge that quickly, conveniently and reliably measures a fastening element and selects a corresponding, properly sized drill bit for forming a hole to engageably receive the fastening element.

It is a further object of this invention to provide a gauge that permits corresponding sizes of fastening elements and complementary drill bits to be quickly and accurately selected, matched and measured for use in a wide variety of projects.

It is a further object of this invention to provide a fastener and drill bit gauge that permits a selected screw to be quickly and accurately matched with a corresponding screw anchor and drill bit.

It is a further object of this invention to provide a fastener and drill bit gauge that eliminates much of the guess work, uncertainty, delay and tedium previously associated with selecting a proper fastener and corresponding drill bit.

It is a further object of this invention to provide a fastener and drill bit gauge that eliminates the need for measuring devices such as calipers to select fasteners and drill bits of an appropriate size.

It is a further object of this invention to provide a fastener and drill bit gauge that may be used with a wide variety of conventional fastening elements.

It is a further object of this invention to provide a fastener and drill bit gauge that is relatively simple and convenient to manufacture and to use, and which may be conveniently stored and transported.

This invention features a fastener and drill bit gauge including a generally flat gauge element. There is a first longitudinal series of holes with different respective diameters formed through the gauge element and arranged in order of progressively increased diameter. Each hole in the first series has a diameter that corresponds to the diameter of a hole formed by a respective drill bit. A second longitudinal series of holes with different respective diameters are formed through the gauge element and arranged substantially parallel to the first series in a like order of progressively increasing diameter. Each hole in the second series is transversely aligned with the corresponding hole in the first series and has a diameter that corresponds to the diameter of a respective fastening element. The respective fastening element is operably engaged with a drill bit hole having a diameter of the aligned hole in the first series. Drill bits and fastening elements are engaged with holes in the first and second series, respectively, to determine a selected size for one of a drill bit and a fastening element and a corresponding size for the other of the drill bit and fastening element.

In a preferred embodiment, the gauge element has flat upper and lower surfaces and a generally rectangular shape. The upper surface may include indicia associated with each hole in the first and second series for identifying the diameter of the hole.

The gauge element may include a plurality of gauge regions, each including respective first and second series of holes formed therein. Each region has hole diameters that are representative of a respective variety of fastening element. Each region may include indicia that identify the respective fastening element. Means are formed in the gauge element for dividing the respective gauge regions from one another.

A linear series of nail measuring holes may be formed in the gauge element separate from the first and second series of holes. The nail measuring holes may be arranged in order of progressively increasing diameter and each may receive nails having no greater than a predetermined associated diameter. A linear series of cotter pin measuring holes may be formed in the gauge element separate from the first and second series of holes. The cotter pin measuring holes likewise may be arranged in a progressively increasing diameter and each may receive cotter pins having no greater than a predetermined associated diameter.

The lower surface of the planar element may include a plurality of distinct and divided sections. Each such section may include indicia that identify features of a respective variety of fastening element.

Mounting holes may be formed through the gauge element. Such mounting holes are engaged by respective fasteners to mount the gauge element to a wall or other substantially vertical surface.

BRIEF DESCRIPTION OF THE DRAWINGS

Other objects, features and advantages will occur from the following description of preferred embodiments and the accompanying drawings, in which.

DETAILED DESCRIPTION OF PREFERRED EMBODIMENT

Figure 1:
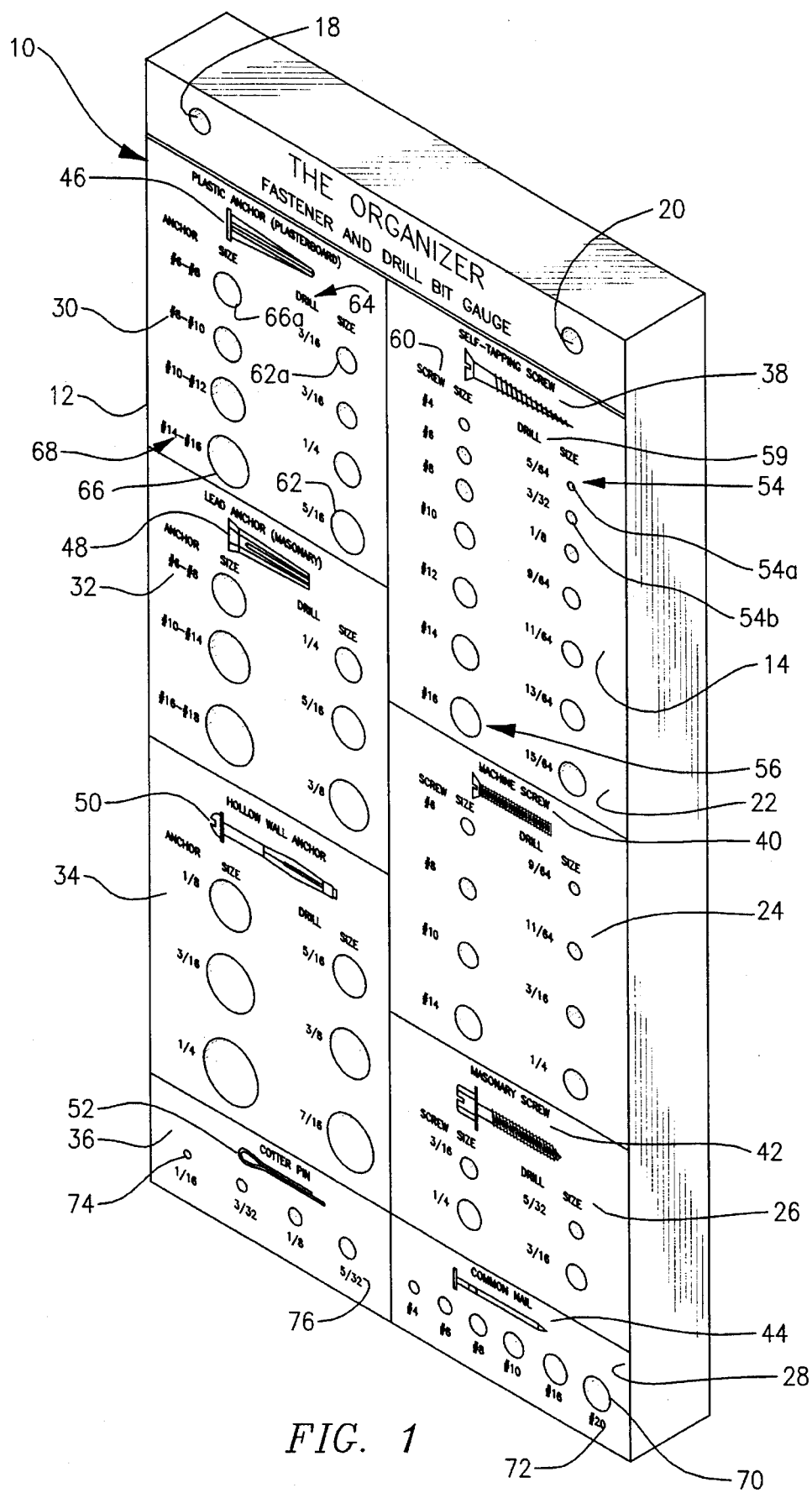
FIG. 1 is a front perspective view of a preferred gauge for measuring fasteners and drill bits according to this invention.

There is shown in FIG. 1 a fastener and drill bit gauge 10 that includes a rectangular, generally planar gauge element 12. The gauge element includes a flat upper surface 14 and a similarly flat reverse surface 16, shown in FIG. 2. Gauge element 12 may be constructed from various light-weight yet durable materials, such as molded plastic. Various types of woods, metals and metal alloys may also be employed. A pair of mounting holes 18 and 20 are formed proximate the upper end of gauge element 12. Holes 18 and 20 are engaged by fasteners or mounting elements, which may include nails, screws, brackets or hooks. Such elements mount gauge element 12 to a garage or workshop wall, a work bench, peg board, etc.

As shown in FIG. 1, front surface 14 is divided by drawn or etched lines into a plurality of gauge regions 22, 24, 26, 28, 30, 32, 34 and 36. Each region corresponds to a respective variety of fastening element. In particular, region 22 corresponds to self-tapping screws. Indicia 38, comprising the words "SELF-TAPPING SCREW", and the graphic representation of such a screw are printed proximate the top of region 14. Region 24 includes indicia 40 which indicates that this region corresponds to machine screws. Region 26 is associated with masonry screws and includes appropriate written and graphic indicia 42 that indicate this. Likewise, regions 28, 30, 32, 34 and 36 include respective written and graphic indicia 44, 46, 48, 50 and 52 that identify those regions as corresponding to common nails, plastic anchors, lead anchors, hollow wall anchors and cotter pins, respectively.

Each of the gauge regions includes a plurality of holes formed into the upper surface 14 of element 12. Each gauge region 22, 24, 26, 30, 32 and 34 includes first and second longitudinal series of holes. In gauge region 22 there is a first longitudinal series of holes 54 and a second parallel series of holes 56. First and second series 54 and 56 are arranged parallel to one another and substantially vertically within region 22. Each series of holes is arranged in order of progressively increasing diameter from top to bottom. The word "SIZE" is printed above each series to indicate that each hole is associated with a particular size or diameter. Each hole in first series 54 has a diameter that corresponds to the diameter of a hole formed by a respective drill bit. Appropriate indicia 59, which identify that diameter, are printed on upper surface 14 adjacent to each hole in series 54. Such indicia indicate that the holes in series 54 range in diameter from 5/64" through 15/64". Seven holes are formed in series 54, although various other number of holes may be employed within the scope of this invention.

The number of holes in second series 56 matches the number of holes in series 54. In this case, seven holes are in series 56. Each hole in the second longitudinal series is transversely aligned with a corresponding hole in the first series and has a diameter that corresponds to the diameter of a respective self tapping screw. Indicia 60 comprising the word "Screw" and assorted screw sizes i.e. #4, #6, #8, #10, #12, #14 and #16 are printed on the surface 14 such that each screw size is printed adjacent a corresponding hole in series 56. Each hole receives screws up to the diameter indicated.

A screw of the size that corresponds with any particular hole in series 56 is operably engageable with a drill bit hole having the diameter of the transversely aligned hole in series 54. For example, a #4 screw, which fits the uppermost hole in series 56 is operably engageable with a drill bit hole 54a of the size exhibited by the uppermost hole in series 54. Hole 54a is formed by a drill having a diameter of 5/64". Similarly, a #6 screw, which fits in the next larger hole in series 56, operably engages the next lower hole 54b in series 54, which hole is formed by a 3/32" drill. This correspondence applies for each of the aligned holes in series 54 and 56.

Analogous parallel and transversely aligned first and second series of holes are also formed in machine screw region 24, masonry screw region 26, plastic anchor region 30, lead anchor region 32 and hollow wall anchor region 34. For example, in plastic anchor region 30, a first vertical series of holes 62 are arranged in order of increasing diameter from top to bottom. Indicia 64 are associated with the holes in series 62. Indicia 64, including the word "Drill" and the drill bit sizes 3/16, 1/4 and 5/16 associated with the respective holes in series 62, are printed within region 30.

Each hole in first series 62 has a diameter that corresponds to the diameter of a hole formed by a respective drill bit, whose size is identified by corresponding indicia 64. A second longitudinal series 66 of holes is arranged vertically within region 30 adjacent to series 62. Again, series 66 is arranged in order of progressively increasing diameter from top to bottom. Each hole in the second series has a diameter that corresponds to (i.e. snugly receives) the diameter of a respective plastic anchor, illustrated by printed indicia 46. Indicia 68 identify the anchor size associated with each hole in series 66. Each anchor accepts multiple sizes of self-tapping screws. For example, an anchor designated #6–#8 is capable of receiving either a #6 or a #8 self-tapping screw. A #8 screw will provide the anchor with a tighter fit, whereas a #6 screw is more easily inserted into the anchor. The use of various diameters of screws with anchors will be understood by those skilled in the art and does not comprise a feature of this invention.

Each hole in series 66 is transversely aligned with a corresponding hole in series 62. Holes 62 represent respective drill bit sizes required to form an opening for receiving an anchor of a size that matches the transversely aligned hole in series 66. In other words, an anchor having a diameter that corresponds with a particular hole 66a in series 66 is operably engageable with a drill bit hole having the diameter of the transversely aligned hole 62a.

Each of regions 24, 26, 32 and 34 likewise includes a pair of parallel first and second series of holes that are arranged in order of increasing diameter from top to bottom. Each hole is transversely aligned with a corresponding hole in the parallel series. In each pair of transversely aligned holes, one of the holes represents a selected size of fastening element and the other hole represents the size of a corresponding drill bit hole that is needed to operably receive that size of fastening element.

Regions 28 and 36 include a single series of holes apiece. In region 26, a horizontal row of holes 70 is formed into the upper surface 14 of the gauge element. Each hole in series 70 corresponds with a respective common nail diameter. Appropriate indicia 72 are printed beneath each hole to indicate the corresponding nail hole size (e.g. #4–#20). Similarly, region 36 includes a series 74 of holes that receive respective diameters of cotter pins. Indicia 76 identify those cotter pin diameters. In each of the regions 28 and 36 multiple holes are formed in order of progressively increasing diameter.

Figure 2:
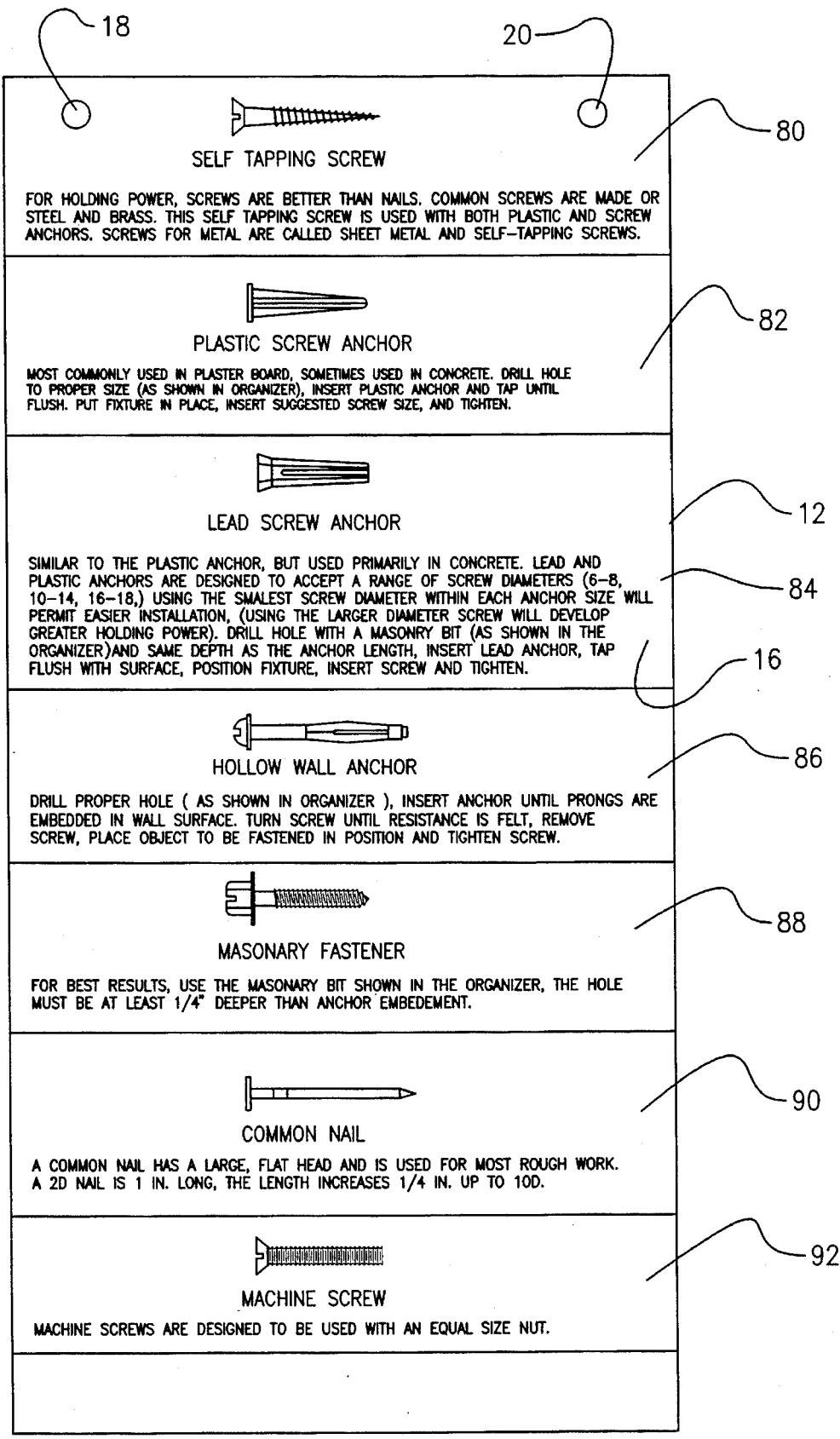
FIG. 2 is a reverse plan view of the fastener and drill bit gauge of FIG. 1, which illustrates the divided sections containing indicia that identify and describe features of respective varieties of fastening elements.

As shown in FIG. 2, reverse side 16 of gauge element 12 is divided by drawn or etched horizontal lines into a plurality of sections 80, 82, 84, 86, 88, 90 and 92. Each section includes indicia that identify and describe the various fastening elements referred to on front surface 14 of gauge element 12.

Figures 3, 4:
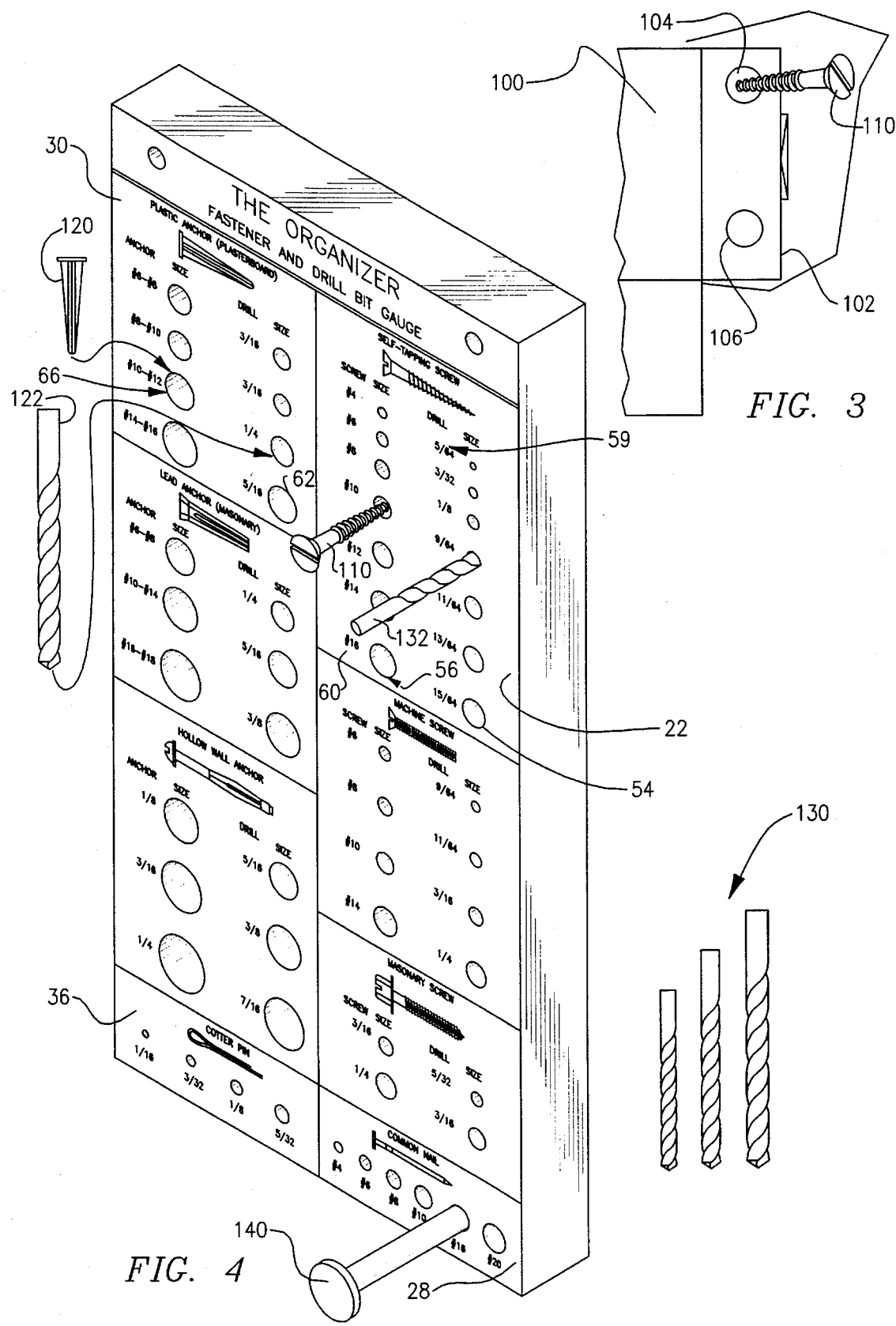
FIG. 3 is an elevational, perspective view of a self-tapping screw being inserted through the hole in a wall mounted bracket in order to determine the screw that will be measured with the gauge of this invention.
FIG. 4 is a front perspective of the fastener and drill bit gauge with various fastening elements and drill bits engaged with the gauge to illustrate how the invention is used.

Gauge 10 is utilized in the manner described in connection with FIGS. 3 and 4. The apparatus is particularly useful for selecting a drill bit so that a properly sized opening is formed for a fastening element. For example, in FIG. 3, a curtain rod 100 must be mounted to a wall. Rod 100 includes an end bracket 102 having a pair of mounting holes 104 and 106. Initially the installer evaluates the weight of the item being mounted and the nature of the wall material. For mounting a curtain to a plasterboard wall, the installer determines that a plastic screw anchor and an accompanying self-tapping screw are the most appropriate forms of attachment. This is determined either through prior knowledge or by using the chart on the reverse side of gauge 10, as illustrated in FIG. 2. Returning to FIG. 3, the installer next determines the appropriate screw size. This is done by inserting various diameters of self-tapping screw 110 through either of holes 104, 106 until and appropriate relatively close tolerance fit is obtained. Screw 110 is then engaged with the holes (e.g. a #10 screw) in series 56 of region 22. The hole that corresponds to screw 110 is the smallest one which receives the screw. In this example, that hole corresponds with the size designation #10. The installer therefore knows that a #10 screw is required to install bracket 102. Alternatively, the installation instructions may call for a predetermined screw diameter. The installer can then insert assorted screws through the hole in series 56 designated #10. The properly sized screw is one which fits through the #10 hole but does not fit in the next smaller hole designated "#8".

After the correct screw size is determined, the installer refers to plastic anchor region 30. Because, in this example, a #10 screw is needed, the installer may utilize either a #8–#10 anchor or a #10–#12 anchor. The former is selected if a greater holding power is required. The latter is selected if easier installation of the screw into the anchor is desired. When the self-tapping screw is relatively large relative to the anchor, the anchor spreads more, thereby providing greater holding power. Conversely, when the screw is relatively small relative to the anchor, it is easier to insert but does not create as great a holding power. In the example illustrated in FIG. 4, the installer selects an anchor 120 having a size #10–#12. As a result, anchor 20 should fit within the hole that corresponds to the designation #10–#12. The installer next refers to the transversely aligned hole in series 62. This hole corresponds to a drill bit 122 having a diameter of ¼".

Accordingly, drill bit 122 has the proper diameter for this job. The drill bit is installed in a drill and the drill is operated to form an opening in the wall. Anchor 120 is inserted into the drilled opening and tapped or hammered into the wall in a conventional manner until it is flush with the wall surface. Bracket hole 104 is then aligned with the open end of anchor 120 and self-tapping screw 110 is engaged with the anchor in a conventional manner to secure the mounting bracket 102 to the wall.

Gauge 10 may be used in various other ways to quickly and conveniently select and/or match drill bits and fastening elements. For example, in simple applications, the user may desire to select a drill bit will be appropriate for mounting a particular self-tapping screw 110 to a wall or other surface, without using any type of anchor. If the size of the screw is known, the user simply refers to the appropriate indicia 60 in region 22. The correct corresponding drill size is represented by the transversely aligned hole in series 54 and its associated indicia 59. If the size of screw 110 is not known, the screw is engaged with the holes in series 56 until fits the smallest hole possible. Then, the user refers to the transversely aligned opening in series 54. When a #10 screw is involved, this aligned opening carries the indicia 9/64". The user next engages his available unmarked drill bits 130 with the 9/64" hole in series 54. Any drill bits that are too large for the hole are eliminated immediately. The properly matching drill bit 132 should be capable of being snugly received in the 9/64" hole but should be incapable of fitting in the next smaller hole i.e. the hole designated ⅛". Drill bit 132 is the correct bit for forming a hole that will operably remove screw 110.

Similar measuring and or matching of fastening elements and drill bits may be accomplished for other types of fasteners by using the other fastening regions designated on gauge 10. Measurements are obtained by engaging the fasteners and drill bits with the respective series of holes in a similar manner to that described above. The gauge is used in a similar fashion for all of the corresponding sizes of fasteners and drill bits designated on the gauge.

In alternative embodiments, the user may already have the desired drill bit and may use the gauge to select a corresponding matching fastener size. Such selection is accomplished by simply reversing the order of operation described above. Initially, the drill bit size is measured using the gauge and the transversely aligned hole is used to select a corresponding fastener size. For common nails and cotter pins, sizes can be measured by simply inserting the respective fastening element into its closest tolerance or most snug hole to determine its size. For example, in FIG. 4, a nail 140 is received in the #16 hole but does not fit in the #10 hole. As a result, the user knows that the nail is approximately a #16. The drill bit holes and fastener holes may be used in a similar manner to measure drill bit and fastener diameters, respectively.

In certain embodiments at least one pair of adjacent drill bit holes may include an identical size. For example, in region 30, the holes in series 62, which represent drill bit holes corresponding to the #6–#8 and #8–#10 anchors, respectively, are each 3/16 of an inch in diameter. That is because this is the appropriate drill bit size for forming both the #6–190 8 and #8—#10 anchors. As used herein, the term "progressively increasing diameter" should be understood to include such embodiments.

This invention therefore provides for a quick, and simple yet reliable means for measuring and/or selecting fasteners and corresponding drill bits. The flat, compact construction permits the device to be easily and inexpensively manufactured, transported, hung and stored. Considerable time and aggravation is saved, particularly when fastener and drill bit sizes are unavailable. The expense and tedium of using measuring instruments such as calipers are also eliminated.

Although specific features of the invention are shown in some drawings and not others, this is for convenience only, as each feature may be combined with any or all of the other features in accordance with the invention. Other embodiments will occur to those skilled in the art and are within the following claims.

What is claimed is:

1. A fastener and drill bit gauge comprising:

gauge element;

a first longitudinal series of holes with different respective diameters formed in said gauge element and arranged in order of progressively increasing diameter, each said hole in said first series having a diameter that corresponds to the diameter of a hole formed by a respective drill bit;

a second longitudinal series of holes with different respective diameters formed in said gauge element and arranged substantially parallel to said first series in a like order of progressively increasing diameter, each hole in said second series being transversely aligned with a corresponding hole in said first series and having a diameter that corresponds with the diameter of a respective self-tapping screw that is operably engagable with a drill bit hole having the diameter of said aligned hole in said first series, whereby one or more drill bit and self-tapping screws are engaged with at least some of said holes in said first and second series, respectively, to measure a selected sizes for one of self-tapping screw and a complementary drill bit and determine a corresponding size for the other of the self-tapping screw and the complementary drill bit;

a first series of indicia disposed on said gauge adjacent to each of said holes in said second series to indicate the diameter of the self-tapping screw that corresponds with each of said holes in said second series;

a third longitudinal series of holes with different respective diameters formed in said gauge element and arranged in order of progressively increasing diameter, each hole in said third series having a diameter that corresponds with the diameter of a respective anchor element that is operably engaged by a plurality of self-tapping screws with different respective diameters;

a second series of indicia disposed adjacent each said hole of said third series, which indicia designate the various respective diameters of the self-tapping screws that are operably engagable with each of said anchor elements;

a fourth longitudinal series of holes with different respective diameters formed in said gauge element and arranged substantially parallel to said third series in a like order of progressively increasing diameter, each hole in said fourth series being transversely aligned with a corresponding hole in said third series and having a diameter that corresponds with a diameter of a hole formed by a respective drill bit, whereby one or more anchor elements and drill bits are engaged with at least some of the holes in said third and fourth series, respectively, to measure a selected size for an anchor element and determine a corresponding size for a complementary drill bit.

2. The gauge of claim 1 in which said gauge element includes a generally planar member having flat upper and lower surfaces.

3. The gauge of claim 2 in which said upper surface includes said first and second series of indicia.

4. The gauge of claim 1 in which said third and fourth longitudinal series of holes are not aligned with said first and second series of holes.

5. The gauge of claim 1 in which each hole in said third series of holes corresponds to a plurality of holes in said second series of holes.

6. The gauge of claim 1 which said gauge element includes a first gauge region that includes said first and second series of holes, a second gauge region that includes said third and fourth series of holes, and third gauge region that includes a fifth and sixth series of holes, each hole in said fifth series having a diameter that corresponds to the diameter of a hole formed by a respective drill bit and each hole in said sixth series having a diameter that corresponds to the diameter of a respective fastening element.

7. The gauge of claim 6 in which each said region includes identification indicia.

8. The gauge of claim 6 in which means are formed in said gauge element for dividing said respective gauge regions from one another.

9. The gauge of claim 1 further including a linear series of nail measuring holes formed in said gauge element separate from said first, second, third and fourth series of holes; said nail measuring holes being arranged in order of progressively increasing diameter and each receiving nails having no greater than a predetermined associated diameter.

10. The gauge of claim 1 further including a linear series of cotter pin measuring holes formed in said gauge element separate from said first, second, third and fourth series of holes; said cotter pin measuring holes being arranged in order of progressively increasing diameter and each receiving cotter pins having no greater than a predetermined associated diameter.

11. The gauge of claim 1 further including mounting holes formed through said gauge element and being engaged by respective fasteners to mount said gauge element to a vertical surface.

12. A method of selecting a drill bit that is correctly sized to form a hole for receiving a respective anchor element, said method comprising the steps of:

forming a gauge element that includes at least three longitudinal series of holes, each series including holes of progressively increasing diameter, said series of holes including, respectively, self-tapping screw holes, anchor element holes and drill bit holes;

each hole in said series of self-tapping screw holes having a diameter that corresponds with the diameter of a respective self-tapping screw, each hole in said series of anchor element holes having a diameter that corresponds with the diameter of a respective anchor element that is operably engaged by multiple self-tapping screws having different respective diameters, said series of drill bit holes being arranged substantially parallel to said series of anchor element holes, each hole in said series of drill bit holes being transversely aligned with a corresponding hole in said series of anchor element holes and having a diameter that corresponds with a diameter of a hole formed by a respective drill bit;

forming a first set of indicia on said gauge element adjacent to each said hole in said series of self-tapping screw holes, which said indicia designate the size of a self-tapping screw that corresponds with each said hole in said series of self-tapping screw holes;

forming a second set of indicia adjacent to each said hole of said series of anchor element holes, which said indicia designate the various diameters of the multiple self-tapping screws that are operably engageable with an anchor element corresponding to said hole in said series of anchor element holes;

engaging a selected self-tapping screw with said series of self-tapping screw holes and determining the smallest diameter hole that accepts said selected self-tapping screw;

referring to said first and second sets of indicia and selecting a hole from said series of anchor element holes having the diameter of said selected self-tapping screw;

engaging at least one anchor element with said selected hole in said series of anchor element holes and determining the largest available anchor element that fits into said selected hole;

engaging at least one drill bit with the hole in said series of drill bit holes that is aligned with said selected hole in said series of anchor element holes and determining the largest diameter drill bit that is received in said aligned drill bit hole, whereby said largest available drill bit is the proper diameter for forming a hole that is operably engageable by said selected anchor element.

13. A fastener and drill bit gauge assembly comprising:

a plurality of self-tapping screws;

a plurality of anchor elements;

a plurality of drill bits;

a first longitudinal series of holes with different respective diameters formed in said gauge element and arranged in order of progressively increasing diameter, each said hole in said first series having a diameter that corresponds to the diameter of a hole formed by a respective said drill bit;

a second longitudinal series of holes with different respective diameters formed in said gauge element and arranged substantially parallel to said first series in a like order of progressively increasing diameter, each hole in said second series being transversely aligned with a corresponding hole in said first series and having a diameter that corresponds with the diameter of a respective self-tapping screw that is operably engageable with a drill bit hole having the diameter of said aligned hole in said first series, whereby one or more drill bits and self-tapping screws are engaged with at least some of said holes in said first and second series, respectively, to measure a selected size for one of a self-tapping screw and a complementary drill bit and determine a corresponding size for the other of the self-tapping screw and the complementary drill bit;

a first series of indicia disposed on said gauge adjacent to each of said holes in said second series to indicate the diameter of the self-tapping screw that corresponds with each of said holes in said second series;

a third longitudinal series of holes with different respective diameters formed in said gauge element and arranged in order of progressively increasing diameter, each hole in said third series having a diameter that corresponds with the diameter of a respective anchor element that is operably engaged by a plurality of self-tapping screws with different respective diameters;

a second series of indicia disposed adjacent each said hole of said third series, which indicia designate the various respective diameters of the self-tapping screws that are operably engageable with each of said anchor elements;

a fourth longitudinal series of holes with different respective diameters formed in said gauge element and arranged substantially parallel to said third series in a like order of progressively increasing diameter, each hole in said fourth series being transversely aligned with a corresponding hole in said third series and having a diameter that corresponds with the diameter of a hole formed by a respective drill bit, whereby one or more anchor elements and drill bits are engaged with at least some of the holes in said third and fourth series, respectively, to measure a selected size for an anchor element and determine a corresponding size for a complementary drill bit.

* * * * *